United States Patent [19]

Van Reesema

[11] 3,903,074

[45] Sept. 2, 1975

[54] METHOD OF PREPARING AN ORGANIC ANION EXCHANGER

[76] Inventor: Nikolaas Hendrik Siewertsz Van Reesema, Woonpark Boswijk, Flat 81, Doorn, Netherlands

[22] Filed: July 1, 1974

[21] Appl. No.: 485,018

Related U.S. Application Data

[63] Continuation of Ser. No. 318,552, Dec. 26, 1972, Pat. No. 3,830,799, which is a continuation-in-part of Ser. No. 153,035, June 14, 1971, abandoned.

[30] Foreign Application Priority Data

June 19, 1970 Netherlands.................... 7009020

[52] U.S. Cl. ............... 260/213; 71/24; 210/500; 210/510
[51] Int. Cl.² ..................................... C08B 15/06

[58] Field of Search.................... 260/213; 71/24

[56] References Cited
UNITED STATES PATENTS

| | | | |
|---|---|---|---|
| 3,307,934 | 3/1967 | Palmer et al............................ | 71/24 |
| 3,674,649 | 7/1972 | Formisano............................ | 71/24 |

*Primary Examiner*—Ronald W. Griffin
*Attorney, Agent, or Firm*—Edward J. Brenner

[57] ABSTRACT

A humic product, such as ammonium humus crystallate or crystal humus acid is treated with an acid to esterify part of the hydroxyl groups, which are then etherified with the non-esterified hydroxyl groups.

The resulting insolubilized humic material is amidated with an excess of a polyamine to produce an anion exchanger.

7 Claims, 2 Drawing Figures

I
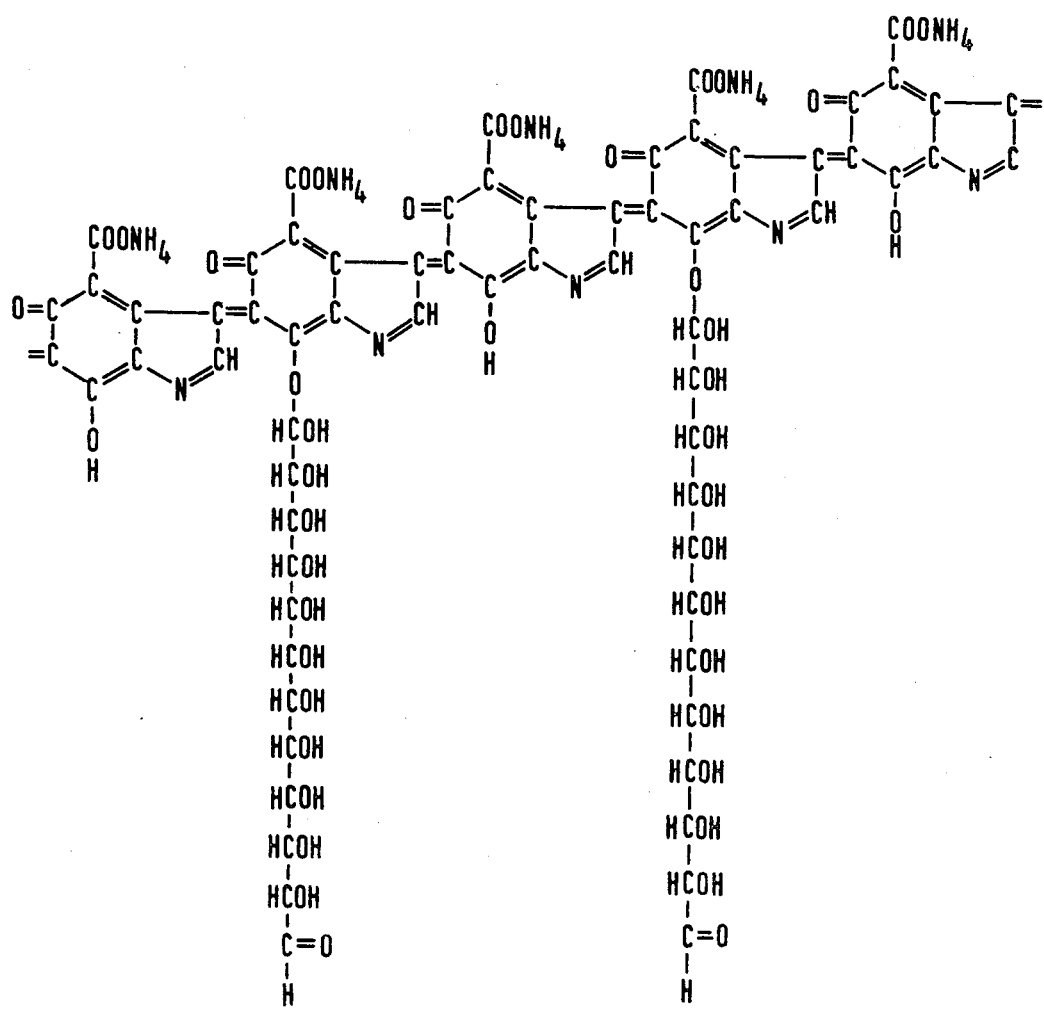

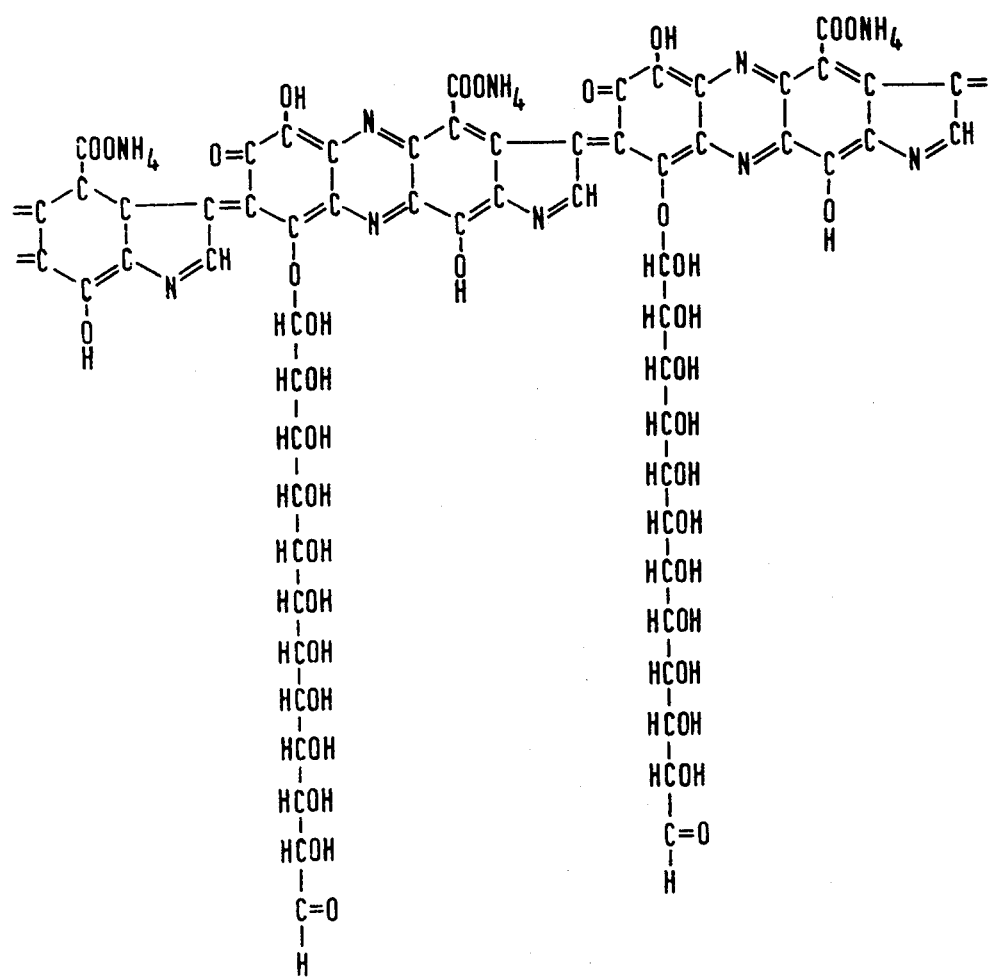

METHOD OF PREPARING AN ORGANIC ANION EXCHANGER

The present application is a continuing application of Ser. No. 318,552, filed Dec. 26, 1972, now U.S. Pat. No. 3,830,799, which is a continuation-in-part of Ser. No. 153,035 filed June 14, 1971, now abandoned.

This invention relates to the preparation of organic anion exchangers.

According to the invention, the starting products are humic materials produced by humification of fossil or recent organic matter.

As such I may use the humic material described in Dutch Pat. Spec. No. 38,776. I preferably employ the product described in Dutch Pat. No. 130,380. For the sake of simplicity, the product described therein, ammonium humus crystallate will hereinafter be termed crystal humus. The corresponding acid will be termed crystal humus acid.

The product called "ammonium humus crystallate" or "crystal humus" as described in Dutch Pat. No. 130,380 is prepared by humification of humous or humus producing materials, in particular sphagnum peat, through the action of excess oxygen or air, the pH being adjusted to about 7 by means of ammonia. The resulting product is an ammonium salt of an acid, which produces the corresponding acid upon acidification with any acid whatsoever. This acid, produced by the acidification, is called "crystal humus acid" in the present application.

BRIEF DESCRIPTION OF THE DRAWING

The FIGURES depict structural formulae of humic materials.

"Ammonium humus crystallate" or "crystal humus" presumable has the structural formula I (see the accompanying sheet of formulae)

The humic material described in Dutch Pat. No. 38,776 has a slightly different structural formula II (see the accompanying sheet of formulae) with a phenazine-like structure.

Both products contain chains having aliphatic non-cyclically linked hydroxyl groups, and I have found that these hydroxyl groups can be converted into epoxy groups by the action of anhydric acids. First, approximately half the number of these hydroxyl groups are esterified. I have found that if one hydroxyl group is esterified, the two adjacent ones are prevented from being esterified. As a result, every other hydroxyl group is esterified. Upon heating the esterified and the non-esterified hydroxyl groups react to form epoxy groups, releasing the acid.

Some suitable acids for insolubilizing the humic materials are anhydrous phosphoric acid and gaseous hydrogen chloride.

Anion exchangers are prepared, starting from the thus insolubilized crystal humus, which is reacted with an excess of a polyamine, preferably a diamine. The excess should at least be such that, on the one hand, amino groups form an acid amide bond with the carboxyl groups, and on the other hand, a sufficient amount of free amino groups remain to form anion exchangers with acids.

In this way anion exchangers are produced with a high exchanging capacity and rate of exchange, which are suitable for many applications.

The amino groups may be quaternised for example, with alkyl halides.

Some suitable acids for insolubilizing the humic materials are anhydrous phosphoric acid and gaseous hydrogen chloride.

Possible uses of the new insoluble anion exchangers are:
 a. in industry (e.g. the sugar industry);
 b. in combination with cation exchangers, for example, for the preparation of fresh water from sea water; $Mg^{++}$ is also removed from sea water;
 c. in combination with cation exchangers, or separately in agriculture and horticulture; in glass houses in combination with each other for conditioning the soil, especially sandy soils.

EXAMPLE I — Action of phosphoric acid on crystal humus acid 10 g dry crystal humus as acid is esterified with 5.5 g 100% phosphoric acid. This quantity is gradually added with continuous vigorous stirring and mixing. The reaction takes place at about 80°C, and the removal of reaction water is promoted by the insufflation of gaseous nitrogen. After esterifying for about 10 minutes, the pH is about 2.

The resulting esterified product is subsequently subjected to etherification to form epoxy groups. The temperature is maintained between 150° and 180°C. Since this reaction is productive of 100% phosphoric acid, which is aggressive, it is neutralized by adding sodium hydrogen carbonate. After etherification for 30 minutes, the last residues of phosphoric acid are washed out until the reaction with barium nitrate is negative.

Granules of the product are deep black when looked upon, although the reflected light differs in colour with different angles of reflection.

When non-insolubilized (ammonium) humus crystallate is dissolved, strong coloration occurs already with minimum quantities. This coloration is caused by the main chain of the crystal humus, which contains a continuous conjugated system.

The pH of sea water is approximately 8. When fresh water is prepared from sea water, the product in the columns is found to be insoluble. This is also the case if the pH is increased, even to 11 and higher. When a 4% NaCl solution was percolated at the pH of sea water, namely 8, a water-clear percolate was formed.

Yield: the starting product was 10 g crystal humus acid.

There was used 5.5 g 100% $H_3PO_4$, which in the esterification produces $5.5 \times (18/98) = 1.01$ g reaction water.

The etherification is productive of 100% $H_3PO_4$ without reaction water.

Therefore, in theory, $10 - 1.01 = 8.99$ g should be recovered.

In practice 8.22 percolate was obtained.

Yield 91%.

EXAMPLE II— Reaction of gaseous hydrogen chloride on crystal humus acid

Since gaseous hydrogen chloride is aggressive and could attack the starting material, the lowest possible temperature is used, namely, room temperature and the hydrogen chloride gas is diluted, for example, with nitrogen or a vacuum is used. Furthermore, the stream of gas is preferably added so slowly that the esterification can keep pace with the addition.

100 kg crystal humus is spread on a perforated round plate in a layer 10 cm thick. The diameter of the plate is 1.30 m. The layer of crystal humus is intensely agitated. A stream of 1 volume nitrogen mixed with 1 volume gaseous hydrogen chloride is pressed through the layer from the bottom upwardly.

Products serving as anion exchangers are prepared, according to this invention, from insolubilized crystal humus, which is reacted with an excess of a polyamine.

It has been found that both low molecular weight diamines, such as n-propylenediamine, and higher diamines such as n-decane-diamine, can be successfully used.

EXAMPLE III — Crystal humus acid amidopropylene amine

The starting product was 10 g insolubilized crystal humus. Theoretically, 2.069 g propylenediamine is required for the amidation (there being three carboxyl groups per polymer unit). A large excess was taken, however, namely, 40 g. When 40 g propylenediamine was added to insolubilized crystal humus the clear liquid was immediately coloured dark. This showed that the crystal humus is at least partly dissolved in propylenediamine.

The treatment was effected at 25°C. In order to remove the reaction water, a vigorous nitrogen stream was passed through the material, which was also passed through a drying bottle containing $P_2O_5$. Droplets of reaction water were formed in the discharge tube, which effect was still visible after 2 hours. The total treatment was continued for 6 hours. Thereafter, water acidified with hydrochloric acid was added.

After acidification the product was insoluble and could easily be filtered. The pH of the filtrate was about 4.

After drying and grinding very small, hard crystals were formed, which showed the light reflections of crystal humus.

10.34 g of the above-mentioned dry product were obtained. Theoretically, 11.5 g can be obtained. The yield is accordingly 90.7%.

In order to determine the anion exchanging capacity of the amidated product, this had first to be converted into the chloride with hydrochloric acid. For this purpose percolation with 1% hydrochloric acid was necessary for a considerable time, until 200 cc had passed through the material. When the percolation with 1% hydrochloric acid is continued for a longer period of time or when elevated temperatures are used, results can be achieved which approach the theoretically possible values.

EXAMPLE IV — Crystal humus acid amidodecaneamine

The starting product was 2.33 g insolubilized crystal humus acid. This product was amidated with an excess of n-decanediamine. The resulting increase in weight corresponded with what was theoretically expected.

Just as in Example III a considerable period of percolation with 1% hydrochloric acid was necessary to convert the amidated product into an anion exchanger.

EXAMPLE IVA

A column containing 7.79 g of the anion exchanger (AC) was charged with an NaCl solution to the condition $Ac^{+-}Cl$. An $NH_4NO_3$ solution of a concentration equivalent to 4% NaCl solution was percolated through the column. 20 cc were percolated through the column in less than 2 minutes. Thereafter, practically no exchange took place any longer, which was apparent from a negative reaction to $Cl^-$ ions. The exchanging capacity was rather more than 61%, but there had been losses of about 10%. With a higher column than that used in the experiment (the highest was 0.8 cm) practically complete exchange could be achieved in about 5 minutes.

I claim:

1. A process for preparing an organic anion exchanger, which comprises reacting a humic product having aliphatic non-cyclically linked hydroxyl groups with an acid to esterify approximately half of the hydroxyl groups contained in said humic product, etherifying the esterified hydroxyl groups with the non-esterified hydroxyl groups with release of the acid used to form an insolubilized humic material, and reacting said insolubilized humic material with an excess of a polyamine and subsequently with an acid.

2. A process according to claim 1, wherein the starting product is ammonium humus crystallate.

3. A process according to claim 1, wherein the first-mentioned acid is anhydrous phosphoric acid.

4. A process according to claim 1, wherein the first-mentioned acid is gaseous hydrogen chloride.

5. A process according to claim 1, wherein the polyamine is n-propylenediamine.

6. A process according to claim 1, wherein the polyamine is n-decanediamine.

7. A process according to claim 1, wherein the last-mentioned acis is dilute hydrochloric acid.

* * * * *